United States Patent [19]

Clandinin et al.

[11] Patent Number: 4,670,285

[45] Date of Patent: Jun. 2, 1987

[54] INFANT FORMULA

[75] Inventors: Michael T. Clandinin, Edmonton; Janet E. Chappell, Toronto, both of Canada

[73] Assignee: The University of Toronto Innovations Foundation, Toronto, Canada

[21] Appl. No.: 711,870

[22] Filed: Mar. 14, 1985

Related U.S. Application Data

[63] Continuation-in-part of Ser. No. 405,849, Aug. 6, 1982, abandoned.

[51] Int. Cl.$^4$ .................. A23C 11/02; A23D 5/00
[52] U.S. Cl. ........................... 426/602; 426/607; 426/613; 426/585; 426/801
[58] Field of Search ............ 426/601, 613, 801, 607, 426/602, 585

[56] References Cited

U.S. PATENT DOCUMENTS

| | | | |
|---|---|---|---|
| 1,622,390 | 3/1927 | Miller | 426/585 X |
| 1,646,228 | 10/1927 | Zoller | 426/801 X |
| 2,611,706 | 9/1952 | Bernhart et al. | 426/801 X |
| 3,201,256 | 8/1965 | Clark et al. | 426/801 X |
| 3,542,560 | 11/1970 | Tomarelli et al. | 426/801 X |
| 3,649,295 | 3/1972 | Bernhart | 426/801 X |
| 4,216,236 | 8/1980 | Mueller et al. | 426/801 X |
| 4,282,265 | 8/1981 | Theuer | 426/801 X |

FOREIGN PATENT DOCUMENTS

| | | |
|---|---|---|
| 681428 | 3/1964 | Canada . |
| 716534 | 8/1965 | Canada . |
| 738932 | 7/1966 | Canada . |
| 845648 | 6/1970 | Canada . |
| 913981 | 11/1972 | Canada . |
| 927188 | 5/1973 | Canada . |
| 927187 | 5/1973 | Canada . |
| 1030393 | 5/1978 | Canada . |
| 1439184 | 6/1976 | United Kingdom . |
| 2035360 | 6/1980 | United Kingdom . |

OTHER PUBLICATIONS

Putnam, J. C., "The Effect of Variations in Dietary Fatty Acids on the Fatty Acid Composition of Erythrocyte Phosphatidylcholine and Phosphatidylethanolamine in Human Infants", the Amer. J. of Clinical Nutr. 36, Jul. 1982, pp. 106-114.

Clandinin, M. T., et al., "Do Low Birth Weight Infants Require Nutrition with Chain Elongation-Desaturation Products of Essential Fatty Acids", Progress in Lipid Research, vol. 20, 1982, pp.901-904.

Clandinin, M. T., et al., "Fatty Acid Utilization in Perinatal De Novo Synthesis of Tissues", Early Human Development, 5, (1981), pp. 355-366.

Clandinin, M. T., et al., "Fatty Acid Accretion in Fetal and Neonatal Liver: Implications for Fatty Acid Requirements", Early Human Development, 5 (1981), pp. 7-14.

Clandinin, M. T., et al., Fatty Acid Accretion in the Development of Human Spinal Cord", Early Human Development, 5 (1981) pp. 1-6.

Clandinin, M. T., et al., "Extrauterine Fatty Acid Accretion in Infant Brain: Implications for Fatty Acid Requirements", Early Human Development, 1980, 4/2, pp. 131-138.

Clandinin, M. T., et al., "Intrauterine Fatty Acid Accretion Rates in Human Brain: Implications for Fatty Acid Requirements", Early Human Development, 1980, 4/2, pp. 121-129.

Atkinson, S. A., et al., "Human Milk: Difference in Nitrogen Concentration in Milk from Mothers of Term and Premature Infants", the J. of Pediatrics, 93, No. 1, Jul. 1978, pp. 67-69.

*Primary Examiner*—Robert Yoncoskie
*Attorney, Agent, or Firm*—Rogers, Bereskin & Parr

[57] ABSTRACT

The invention provides an edible fat product for incorporation into a formula suitable for feeding infants. The product includes certain fatty acids, namely, at least one of a $C_{20}$ or $C_{22}$, $\omega$-6 fatty acid and a $C_{20}$ or $C_{22}$, $\omega$-3 fatty acid, found to be present in human milk. These fatty acids are included in the product in certain defined amounts to avoid causing harmful effects on an infant fed on the product. The $C_{20}$ or $C_{22}$, $\omega$-6 fatty acids, if present, are included in a total amount of about 0.13%-5.6% by weight of all fatty acids in the product. The $C_{20}$ or $C_{22}$, $\omega$-3 fatty acids, if present, are included in a total amount of about 0.013%-3.33% by weight of all fatty acids in the product.

42 Claims, No Drawings

INFANT FORMULA

This application is a continuation-in-part of my application for U.S. Letters Patent Ser. No. 405,849, filed Aug. 6, 1982, now abandoned.

This invention relates to an edible flat product for incorporation into an infant food formula.

In recent years, effort has been directed at producing a milk-based infant formula which is similar to human milk. For example, Canadian Pat. No. 927,187 discloses a dietary product which may be added to commercially available cow's milk. The dietary product is intended to adapt the cow's milk to the requirements of human nursing and to make the cow's milk similar to human milk. The lipid component of the dietary product is preferably a mixture of vegetable oil with soy lecithin and eventually with milk fats.

Canadian Pat. No. 927,188 discloses an edible fat composition intended to resemble that of human milk fat. The composition comprises various proportions of oleic oil; oleo oil; a seed oil comprising one or more of soybean oil, corn oil, peanut oil, sunflower seed oil and cottonseed oil; coconut oil and/or babassu oil; and soy lecithin.

The dietary products and fatty acid compositions disclosed in the above patents relied upon edible oils, soy lecithin and/or milk fats to form the lipid component. However, these oils do not contain the $C_{20}$ and $C_{22}$, $\omega$-6 and $\omega$-3 fatty acids which are present in human milk. Accordingly, these dietary preparations do not provide a balance of fatty acids that are similar in composition to that of human milk.

It is now known that the composition of dietary fat is a major determinant of tissue composition during the formative stage in the growth and development of an organ. Recently, the fatty acid content of fetal tissues was utilized to estimate essential fatty acid accretion during intrauterine growth (Clandinin et al, Early Human Development, 1981, 5: 355–366). This study calculated that intrauterine synthesis of adipose organs utilized some 285 mg. per day of $C_{20}$ and $C_{22}$, $\omega$-6 fatty acids and some 47.4 mg. per day of $C_{22}$, $\omega$-3 fatty acids. It was found that an adequate intake of mothers own milk would provide from 90 mg. to 130 mg. of $C_{20}$ and $C_{22}$, $\omega$-6 fatty acids per day and 55-75 mg. of $C_{20}$ and $C_{22}$, $\omega$-3 fatty acids per day. An earlier study (Clandinin et al, Early Human Development, 1980, 4, 121–129) investigated fatty acid components of infant brain during the last trimester of development in the fetus. Marked substantial accretion of $C_{20:4}$, $\omega$-6 and $C_{22:6}$, $\omega$-3 fatty acids occurred.

In view of the above studies, dietary formulas for the premature or pre-term infant should contain $C_{20}$ and $C_{22}$, $\omega$-6 fatty acids and $C_{20}$ and $C_{22}$, $\omega$-3 fatty acids to promote healthy growth normally occurring intrauterine. In view of the second study referred to, such fatty acids have particular significance for the synthesis of structural lipids in brain tissue. However, this study did not suggest any means of determining the quantities of these fatty acids required in such a formula.

In the first study referred to above, fatty acid analysis of human milk at day 16 of lactation was utilized to estimate for the first time the pre-term infants' daily intake of $C_{20}$ and $C_{22}$, $\omega$-6 and $\omega$-3 fatty acids. The study indicated that significant amounts of these fatty acids are normally received by the infant fed human milk.

Past studies have not resolved the nutritional biochemical question of how much and which essential fatty acids should be provided in a dietary formula to premature infants to ensure normal synthesis of nerve tissues. Such tissues would normally contain high levels of long-chain metabolites of essential fatty acids as basic structural material. In particular, it is important that the quantities of the $C_{20}$ and $C_{22}$, $\omega$-6 and $\omega$-3 fatty acids be limited to appropriate ranges in a dietary formula. Insufficient supply of these fatty acids would curb brain development. Over-feeding of these fatty acids could distort normal prostaglandin metabolism and thus have adverse effects on the infant's physiology. For example, providing too much of these fatty acids could result in over-production of prostaglandins in the gut, which could lead to a hyperactive gut and diarrhea.

Studies on the composition of human milk have identified further substances not found in many cows milk-based formulas. Recently, it has been shown that human milk contains physiologically active concentrations of prostaglandins, specifically prostaglandin $E_2$, prostaglandin $F_{2\alpha}$, and the metabolite of prostaglandin $I_2$ namely 6-keto prostaglandin $F_{1\alpha}$. These prostaglandins and their metabolites are present in human milk at all stages of lactation and change in concentration during lactation in a manner analogous to the development of the infant's capacity to absorb nutrients. For example, in approximately the first three weeks of infant life, the level of these prostaglandins and their metabolites increases in human milk as does the infant's capacity to absorb nutrients.

It has been known in man that prostaglandins affect functions related to nutrient absorption. Thus, in the human a variety of physiological funcitons are affected in the gut by prostaglandins e.g. gastric acid and mucous secretion, smooth muscle contraction, local circulation, nutrient transport and absorption.

However, the presence of prostaglandins and their metabolites in human milk has not been previously recognized. Consequently the potential of prostaglandins and their metabolites in milk to influence gastrointestinal physiology in newborn infants, and thus the rates of nutrient absorption for infants fed human milk, has not been appreciated.

The present invention provides information on the range of prostaglandin content that would stimulate benefits to infants fed semi-synthetic or milk based infant formulas.

An object of the present invention is to provide a stable liquid infant formula with an improved fatty acid composition having suitable shelf life.

A further object of the present invention is to provide an edible fat product for incorporation in a formula suitable for pre-term infants which will contain appropriate levels of the $C_{20}$ and $C_{22}$, $\omega$-6 and $\omega$-3 fatty acids to promote normal brain development and healthy growth.

A further object of the present invention is to provide an improved infant formula containing prostaglandins and a metabolite.

Accordng to one aspect of the invention, an edible fat product is provided for incorporation in a formula suitable for feeding infants. The product comprises at least one of the following:

(a) a fatty acid source of semi-purified or purified origin containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 0.13%–5.6% by weight of all fatty acids in the product; and (b) a fatty acid source of semi-purified or purified origin containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.013–3.33% by weight of all fatty acids in the product.

Accordingly to a further aspect of the invention, a formula is provided which is suitable for feeding infants. The formula comprises sugar, non-fat milk, water and an edible fat, said fat comprising at least one of the following (a) a fatty acid source of semi-purified or purified origin containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 5–100 mg. per 100 mls. of the formula;

(b) a fatty acid source of semi-purified or purified origin containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.5–60 mg. per 100 mls. of the formula.

According to a further aspect of the invention, a formula is provided which is suitable for feeding infants. The formula comprises sugar, non-fat milk, water, edible fat, and at least one of the following (a) prostaglandin $E_2$ in a concentration of about 50–1000 nanograms per 100 mls. of the formula;

(b) 6-keto prostaglandin $F_{1\alpha}$ in a concentration of about 20–300 nanograms per 100 mls. of the formula;

(c) prostaglandin $F_{2\alpha}$ in a concentration of about 25–300 nanograms per 100 mls. of the formula.

It will be understood by persons skilled in the art that the edible fats and prostaglandins utilized in the products of this invention are of semi-purified or purified origin. By semi-purified or purified is meant a material which has been prepared by purification of a natural material or by synthesis. These techniques are well known in the art. The products of this invention, therefore, in no way include natural products themselves.

The milk of more than fifty mothers of full-term intants and pre-term infants were sampled between day 4 and day 150 of lactation. Each mother was sampled over 10 different days of lactation, and on specific days was sampled 6 times over 24 hours. From analysis of the samples, the fatty acid composition of human milk by weight was determined (Table 1). The amount of each of the fatty acids in Table 1 was expressed as a percentage of the total of the fatty acids in the milk by weight.

In Table 2, the concentration of various fatty acids is expressed in mg. per 100 mls. of human milk.

From the above analysis, it was observed that the total concentration of $C_{20}$ and $C_{22}$, $\omega$-6 fatty acids in any of the samples was at least 5 mg. per 100 mls. of human milk. Similarly, the lower limit to the total concentration of $C_{20}$ and $C_{22}$, $\omega$-3 fatty acids for all of the samples was about 0.5 mg. per 100 mls. of human milk. These lower limits were used as a starting point for determining the ranges of the $\omega$-6 and $\omega$-3 fatty acids in the infant formula (as indicated below).

In order to provide an apprropriate source of structural lipids for use in new tissue synthesis and as an energy substrate, each 100 mls. of infant formula should contain about 2.8±1.0 grams total of fatty acid.

TABLE 1

| Fatty Acid Composition of Human Milk | |
|---|---|
| Fatty Acid (% w/w) | Human Milk[1] |
| Short chain | 2.0 ± 0.6 |
| Medium chain | 11 ± 1.7 |
| $C_{16:0}$ | 20 ± 2.4 |
| $C_{16:1}$ | 3.2 ± 0.3 |
| $C_{18:0}$ | 5.8 ± 0.7 |
| $C_{18:1}$, $\omega$-9 | 38 ± 2.9 |
| $C_{18:2}$, $\omega$-6 | 12 ± 4.3 |
| $C_{18:3}$, $\omega$-3 | 0.9 ± 0.4 |
| $C_{20:4}$, $\omega$-6 | 0.5 ± 0.1 |
| $C_{20}$ and $C_{22}$ $\omega$-6 | 1.0 ± 0.2 |
| $C_{20:5}$, $\omega$-3 | 0.125 ± 0.04 |
| $C_{22:6}$, $\omega$-3 | 0.36 ± 0.032 |
| $C_{22}$, $\omega$-3 | 0.52 ± 0.063 |
| $C_{20}$ and $C_{22}$ $\omega$-3 | 0.7 ± 0.2 |
| $C_{20:0}$, $C_{22:0}$, $C_{24:0}$ | 0.5 ± 0.1 |
| Other fatty acids | ~4.4 |

[1]Mean ± SDX for n = 16

TABLE 2

| Fatty Acid Intake Provided by Human Milk | |
|---|---|
| Fatty Acid | Fatty Acid Intake (mg/100 mls) |
| Short Chain[3] | 216 ± 24 |
| $C_{14:0}$ | 214 ± 24 |
| $C_{16:0}$ | 465 ± 25 |
| $C_{18:0}$ | 147 ± 17 |
| $C_{20:0}$ | 5.2 ± 1.3 |
| $C_{22:0}$ | 2.5 ± 0.5 |
| $C_{24:0}$ | 0.4 ± 0.2 |
| $C_{18:2}$, $\omega$-6 | 288 ± 60 |
| $C_{18:3}$, $\omega$-6 | 0.8 ± 0.4 |
| $C_{20:2}$, $\omega$-6 | 9.8 ± 2 |
| $C_{20:3}$, $\omega$-6 | 9.4 ± 1.4 |
| $C_{20:4}$, $\omega$-6 | 13.9 ± 0.8 |
| $C_{22:3}$, $\omega$-6 | 1.8 ± 0.3 |
| $C_{22:4}$, $\omega$-6 | 3.4 ± 0.3 |
| $C_{22:5}$, $\omega$-6 | 1.7 ± 0.3 |
| Total $\omega$-6 | 328 ± 63 |
| $C_{18:3}$, $\omega$-3 | 28.5 ± 5.9 |
| $C_{18:4}$, $\omega$-3 | 7.6 ± 1.3 |
| $C_{20:4}$, $\omega$-3 | 1.5 ± 0.5 |
| $C_{20:5}$, $\omega$-3 | 3.2 ± 0.8 |
| $C_{22:5}$, $\omega$-3 | 3.4 ± 0.3 |
| $C_{22:6}$, $\omega$-3 | 9.1 ± 0.8 |
| Total $\omega$-3 | 53.4 ± 6.4 |
| $C_{14:1}$ | 2 ± 0.4 |
| $C_{16:1}$ | 81.9 ± 43.5 |
| $C_{18:1}$ | 908 ± 43.5 |
| $C_{24:1}$ | 2.2 ± 0.5 |
| Total Fatty Acid | 2558 ± 133 |

[1]Values (x ± SE · 2) are given for mothers delivering an infant after 28–32 weeks of gestation.
[2]The level of energy intake used for calculation was 120 kcal/kg body weight/day based on ~1300 gms body weight.
[3]Includes fatty acids from $C_8$ to $C_{12}$.

If 3.8 grams total of fatty acid are incorporated into the infant formula, then in order to have a concentration of at least about 5 mg. total of the $C_{20}$ and $C_{22}$, $\omega$-6 fatty acids per 100 mls of the formula, these fatty acids must comprise at least about 0.13% by weight of all the fatty acid incorporated in the formula. Similarly, in order to have a concentration of at least about 0.5 mg. total of the $C_{20}$ and $C_{22}$, $\omega$-3 fatty acids per 100 mls of formula when 3.8 grams total of fatty acid are incorporated into the formula, at least about 0.013% by weight of the total fatty acid incorporated should be these $\omega$-3 fatty acids.

It was determined that when the total of the $C_{20}$ and $C_{22}$, $\omega$-6 fatty acids was between about 5 mg. to 100 mg. and the total of the $C_{20}$ and $C_{22}$, $\omega$-3 fatty acids was between about 0.5 mg. to 60 mg., per 100 mls of infant formula, these ranges separately or in combination could be achieved without unduly distorting the balance of the fatty acid components which it was attempted to formulate. That is, these ranges are consistent with physiologically acceptable concentrations of the fatty acids. In order to achieve a concentration of 100 mg. total of the $C_{20}$ and $C_{22}$, $\omega$-6 fatty acids per 100 mls. of formula when 1.8 grams of total fatty acid are incorporated in the formula, about 5.6% by weight of the fatty acid incorporated should be these $\omega$-6 fatty acids. Similarly, to achieve a total of 60 mg. of the $C_{20}$ and $C_{22}$, $\omega$-3 fatty acids per 100 mls of infant formula, if 1.8 grams total fatty acid is incorporated into the formula, then about 3.33% by weight of the fatty acid incorporated should be these $\omega$-3 fatty acids.

Accordingly, the total of the $C_{20}$, $\omega$-6 fatty acids and the $C_{22}$, $\omega$-6 fatty acids is about 0.13-5.6% by weight of all fatty acids in the fat product. The total of the $C_{20}$, $\omega$-3 fatty acids and the $C_{22}$, $\omega$-3 fatty acids is about 0.013-3.33% by weight of all fatty acids in the fat product.

Preferred ranges may be selected which more closely reflect the biological variation in fatty acid concentrations present in human milk. Thus, preferably, each 100 mls. of the formula contains a total of about 0.5-40 mg. of said $C_{22}$, $\omega$-3 fatty acids.

More preferably, each 100 mls. of the formula contains about 15-70 mg. total of said $C_{20}$, $\omega$-6 and said $C_{22}$, $\omega$-6 fatty acids, about 2-25 mg. total of said $C_{20}$, $\omega$-3 and said $C_{22}$, $\omega$-3 fatty acids, and about 2-25 mg. total of said $C_{22}$, $\omega$-3 fatty acids.

Studies have suggested that the human fetus uutilizes large quantities of $C_{20:4}$, $\omega$-6 and $C_{22}$, $\omega$-3 (primarily $C_{22-6}$, $\omega$-3) fatty acids for synthesis of human brain. Studies have further suggested that $C_{20:5}$, $\omega$-3 fatty acids are a precurser for Series 3 Prostaglandins, and for $C_{22:5}$, $\omega$-3 and $C_{22:6}$, $\omega$-3 which are normal components of neural tissues. In order that the nutritional support of the pre-term infant should provide for feeding of these components, each 100 mls. of the formula preferably contains a total of about 5-80 mg. of the $C_{20:4}$, $\omega$-6 fatty acids, about 1-40 mg. of the $C_{22:6}$, $\omega$-3 fatty acids, and about 0.5-15 mg. of the $C_{20:5}$, $\omega$-3 fatty acids. These ranges are consistent with physiologically acceptable concentrations of the fatty acids. More preferably, each 100 mls. of the formula contains a total of about 10-70 mg. of the $C_{20:4}$, $\omega$-6 fatty acids, about 5-22 mg. of the $C_{22:6}$, $\omega$-3 fatty acids, and about 2-8 mg. of the $C_{20:5}$, $\omega$-3 fatty acids. These ranges more closely reflect the biological variation in fatty acid concentrations present in human milk.

Preferred percentage ranges can then be calculated from the last three paragraphs. Thus, preferably the total of the $C_{22}$, $\omega$-3 fatty acids is about 0.013-2.22% by weight of all fatty acids in the fat product incorporated in the formula.

More preferably, the total of said $C_{20}$, $\omega$-6 and said $C_{22}$, $\omega$-6 fatty acids is about 0.39-9% by weight of all fatty acids in the fat product, the total of said $C_{20}$, $\omega$-3 fatty acids is about 0.05-1.39% by weight of all fatty acids in the product, and the total of said $C_{22}$, $\omega$-3 fatty acids is about 0.05-1.39% by weight of all fatty acids in the product.

Similarly, the total of the $C_{20:4}$, $\omega$-6 fatty acids is preferably about 0.13-4.44%, the total of the $C_{22:6}$, $\omega$-3 fatty acids is preferably about 0.02-2.22%, and the total of the $C_{20:5}$, $\omega$-3 fatty acids is preferably about 0.01-0.83%, by weight of all fatty acids in the fat product. More preferably, the total of the $C_{20:4}$, $\omega$-6 fatty acids is about 0.26-3.9%, the total of the $C_{22:6}$, $\omega$-3 fatty acids is about 0.13-1.22%, and the total of the $C_{20:5}$, $\omega$-3 fatty acids is about 0.05-0.44%, by weight of all fatty acids in the fat product. These percentage ranges were determined using the preferred milligram ranges given on the last two pages. The percentage ranges were calculated as described above for the total $C_{20}$ and $C_{22}$, $\omega$-6 and $\omega$-3 percentage ranges.

In order to achieve fatty acid compositions within the above specified ranges, the edible fat product is preferably a blend of egg yolk lipid and at least one member of the group of coconut oil and soybean oil. Preferably the egg yolk lipid in the blend is about 75-95 parts by weight, and the total of the coconut oil and the soyabean oil in the blend is about 5-25 parts by weight. Alternately, the fatty acids may be derived from phospholipids of red blood cell membranes. More preferably, the fatty acids are derived from a blend of about 5-25 parts coconut oil and about 75-95 parts egg yolk lipid by weight, or a fat source of similar composition. The approximate fatty acid composition of coconut oil and egg yolk lipid is shown in Table 3.

TABLE 3

| Fatty Acid Composition of Natural Fats Utilized in the Lipid Formulation | | |
|---|---|---|
| Fatty Acids (% w/w) | Coconut Oil | Egg Yolk Lipid |
| Short chain | 14.1 | |
| Medium chain | 60.1 | 0.36 |
| $C_{16:0}$ | 8.2 | 26.1 |
| $C_{16:1}$ | 0.4 | 3.32 |
| $C_{18:0}$ | 3.0 | 10.2 |
| $C_{18:1}$, $\omega$-9 | 5.7 | 37.1 |
| $C_{18:2}$, $\omega$-6 | 1.8 | 10.7 |
| $C_{18:3}$, $\omega$-3 | — | 0.35 |
| $C_{20:4}$, $\omega$-6 | | 1.5-2.8 |
| $C_{20}$ and $C_{22}$, $\omega$-6 | | 1.5-3.96 |
| $C_{20:5}$, $\omega$-3 | | 0-0.095 |
| $C_{22:6}$, $\omega$-3 | | 0.5-0.85 |
| $C_{22}$, -3 | | 0.5-1.1 |
| $C_{20}$ and $C_{22}$, $\omega$-3 | | 0.5-0.9 |
| $C_{20:0}$, $C_{22:0}$, $C_{24:0}$ | 0.9 | 0.1 |
| Other fatty acids | 5.8 | 5.25 |

An alternate and preferred source of the $C_{20}$ and $C_{22}$, $\omega$-6 and $\omega$-3 fatty acids is fish or marine oil. Without limiting the foregoing, such fish oils as Tilapia, Menhaden, Herring, Caplin and mixtures thereof, can be used. The amount of fish oil needed to achieve the desired range of the $C_{20}$ and $C_{22}$, $\omega$-6 and $\omega$-3 fatty acids will vary according to the particular fish oil used. Also, the fatty acid composition of fish oils is subject to season differences.

It will be understood to persons skilled in the art, that egg yolk lipid, fish oil and phospholipids of red blood cells are only exemplary of fatty acid sources of semi-purified or purified origin containing one or more of the $C_{20}$ and $C_{22}$, $\omega$-3 and $\omega$-6 fatty acids in the desired ranges. Other edible semi-purified or purified sources of these fatty acids will be evident to persons skilled in this art. The blending of such fatty acid sources with other oils of vegetable origin to achieve the above-described ranges of the fatty acids, is within the ordinary skill of the art.

As mentioned above, to achieve the desired amounts of fatty acids and to more closely approximate the fatty acid content of human milk, the source of the $C_{20}$ and $C_{22}$, $\omega$-3 and $\omega$-6 fatty acids is preferably blended with an oil of vegetable origin. Such oils include, without limiting same, coconut oil, soyabean oil, cocoa oil, palm oil, oleo oil, sunflower oil, and mixtures thereof. Other suitable vegetable oils will be evident to persons skilled in the art.

The values in Table 3 indicate ranges for the concentrations of $C_{20}$ and $C_{22}$, $\omega$-6 and $\omega$-3 fatty acids in the egg yolk lipid. It will be appreciated that the concentrations of fatty acids in the egg yolk lipid will vary somewhat depending on the source of the egg yolk.

Table 4 shows the approximate fatty acid composition of one blend of about 10 parts of coconut oil and 90 parts of egg yolk lipid. From a comparison of Tables 1 and 4, it will be seen that using this blend of egg yolk lipid and coconut oil, the fatty acid composition achieved is relatively similar to that of human milk. This shows an advantage of using a blend partly derived from egg yolk lipid, or a source of fatty acids of similar composition to egg yolk lipid. However, it will be appreciated that other sources of the fatty acids can be used.

A further advantage to using egg yolk lipid as a source of fatty acids is that the $C_{20}$ and $C_{22}$, $\omega$-6 and $\omega$-3 fatty acids are then derived from a natural fat. Moreover, the edible fat product of this invention has beneficial effects on the synthesis of brain tissue, and on the absorption of calcium, and is absorbed in the gut at a high rate. Therefore the fat product is especially suited for incorporation into an infant formula particularly adapted for total nutritional support of the human infant.

TABLE 4

Approximate Fatty Acid Composition of a blend of Coconut Oil and Egg Yolk Lipid

| Fatty Acid (% w/w) | Fat Blend[1] |
|---|---|
| Short chain | 1.4 |
| Medium chain | 6.3 |
| $C_{16:0}$ | 24.3 |
| $C_{16:1}$ | 3.1 |
| $C_{18:0}$ | 9.3 |
| $C_{18:1}$, $\omega$-9 | 34.0 |
| $C_{18:2}$, $\omega$-6 | 9.8 |
| $C_{18:3}$, $\omega$-3 | 0.32 |
| $C_{20:4}$, $\omega$-6 | 1.35–2.52 |
| $C_{20}$ and $C_{22}$, $\omega$-6 | 1.35–3.56 |
| $C_{20:5}$, $\omega$-3 | 0–0.086 |
| $C_{22:6}$, $\omega$-3 | 0.45–0.77 |
| $C_{22}$, $\omega$-3 | 0.45–0.99 |
| $C_{20}$ and $C_{22}$, $\omega$-3 | 0.45–0.81 |
| $C_{20:0}$, $C_{22:0}$, $C_{24:0}$ | 0.2 |
| Other fatty acids | 5.5 |

[1] Approximately 10 parts coconut oil and 90 parts egg yolk lipid.

Preferably the fat product of this invention is incorporated into an aqueous infant formula further comprising a sugar, non-fat milk, water and optionally a protein source.

In addition to the edible fat product, the infant formula preferably comprises a source of macronutrient, i.e. protein and carbohydrate, and an appropriate combination of minerals and vitamins. A typical protein source would be electrodialysed whey or electrodialysed skim milk or milk whey, although other protein sources are also available and may be used. Sugars would include food substances such as glucose or edible lactose. The infant formula would preferably include the following vitamins and minerals: calcium, phosphorous, potassium, sodium, chloride, magnesium, mangansese, iron, copper, zinc, selenium, iodine, and Vitamins A, E, D, and the B complex. These micronutrients would be added in the form of commonly accepted nutritional compounds in amounts equivalent to those present in human milk on an energy basis, i.e. on a per calorie basis. Water is included to obtain an aqueous suspension of nutrients providing the appropriate essential nutrient to energy balance contained within an appropriate fluid volume.

More preferably, the infant formula comprises an aqueous suspension containing in each 100 mls $2.8 \pm 1.0$ gm. of fatty acid derived from a blend of egg yolk lipid and coconut oil, or fat of similar fatty acid composition so that the formula contains the $C_{20}$ and $C_{22}$, $\omega$-6 and $\omega$-3 fatty acids within the appropriate ranges of concentrations set out above. The infant formula in each 100 mls. further preferably comprises $2.6 \pm 1.0$ gm. of protein source, $10 \pm 5$ gm. of sugar.

Table 5 shows an example of an appropriate nutrient composition for a ready-to-feed infant formula suitable for pre-term infants. The fat soluble vitamins can be dissolved in the fat blend and the remaining formula ingredients can be dissolved in the water. The fat blend with the dissolved vitamins and the water solution can then be mixed and homogenized. Adequate amounts of other trace minerals are present in the electrodialysed whey and non-fat milk.

The infalt formula can be sterilized and subsequently utilized on a ready-to-feed basis or stored as a concentrate. The concentrate can be prepared by spray drying the infant formula prepared as indicated above, and the formula can be reconstituted by rehydrating the concentrate. Moreover, the infant formula is a stable liquid and has a suitable shelf life.

TABLE 5

Appropriate nutrient composition of a Proposed Formula for feeding of Preterm infants.

| | Amounts per 100 mls |
|---|---|
| Fatty acid (Fat blend of coconut oil, soyabean oil and egg yolk lipid, or fat source of similar composition) | 2.8 g |
| Lactose | 8 g |
| Protein (Electrodialysed Whey and non-fat milk) | 2.1 g |
| Vitamin A USP units | 265 |
| Vitamin D USP units | 42 |
| Vitamin E I.U. | 0.6 |
| Vitamin $B_1$ (Thiamine HCl) | 0.07 mg |
| Partothenic Acid | 0.21 mg |
| Vitamin $B_2$ (Riboflavin) | 0.11 mg |
| Vitamin C (Ascorbic Acid) | 5.3 mg |
| Vitamin $B_6$ (Pyridoxine HCl) | 0.04 mg |
| Vitamin $B_{12}$ (Cyanocobalamin) | 0.11 mg |
| Niacinamide | 0.53 mg |
| Folic Acid | 3.2 mg |
| Calcium | 42 mg |
| Phosphorus | 33 mg |
| Sodium | 15 mg |
| Potassium | 55 mg |
| Chloride | 41 mg |
| Mangesium | 6.0 mg |
| Iron | 0.85 mg |
| Copper | 0.04 mg |
| Zinc | 0.32 mg |
| Iodine | 6.9 meq |
| Selenium | 0.01 μg |
| Water | to 100 ml volume |
| Choline | 9 mg |
| Inositol | 10 mg |
| Manganese | 1 μg |

Table 6 shows the approximate range of prostaglandin content of human milk for certain prostaglandins and a metabolite.

Appropriate ranges for the prostaglandins and the metabolite of Table 6 can be selected which are consistent with physiologically acceptable concentrations of these compounds. Thus, it was determined that when the total of the prostaglandin $E_2$ was between about 50–1000 nanograms, the total of the 6-keto prostaglandin $F_{1\alpha}$ was between about 20–300 nanograms, and the total of the prostaglandin $F_{2\alpha}$ was between about 25–300 nanograms, per 100 mls. of infant formula, these ranges separately or in combination could be achieved without unduly distorting the balance of the components which it was attempted to formulate.

Preferably, each 100 mls. of the formula contains at least one of the following:

(a) a total of about 200–500 nanograms of prostaglandin $E_2$;

(b) a total of about 25–50 nanograms of 6-keto prostaglandin $F_{1\alpha}$;

(c) a total of about 25–100 nanograms of prostaglandin $F_{2\alpha}$.

TABLE 6

Approximate Content of Human Milk for Certain Prostaglandins and a Metabolite

|  | Amounts (ng/100 mls) |
|---|---|
| Prostaglandin $E_2$ | 100–800 |
| 6-Keto Prostaglandin $F_{1\alpha}$ | 25–200 |
| Prostaglandin $F_{2\alpha}$ | 25–200 |

The latter ranges more closely reflect the biological variation in concentrations of these compounds present in human milk.

These compounds can be added with the fat during preparation of the above or other infant formulas. The compounds can also be added to the above or other infant formulas as a sterile preparate after the heat sterilization stage.

These prostaglandins and metabolite are available from the Upjohn company as 0.5 mg. tablets or 0.5 mg./cc. ampule injectible solutions. However, preferably the compounds are added in the pure form. Alternately the sterile preparate can be prepared from ampules of these or other injectible solutions.

The invention will be more fully understood by reference to the following examples. However, these examples are merely intended to illustrate embodiments of the invention and are not to be construed to limit the scope of the invention.

EXAMPLE I

About 2.52 grams of fatty acid extracted from egg yolk was combined with about 0.28 grams of coconut oil. This fat blend was thoroughly homogenized at 35° C. just before use.

It was calculated that the edible fat product represented by this fat blend comprised approximately the following fatty acids (based on the approximate fatty acid values shown below for the egg yolk lipid used):

| Fatty Acids (% w/w) | Egg Yolk Lipid | Fat Blend |
|---|---|---|
| $C_{20:4}$, $\omega$-6 | 2.1% | 1.89% |
| $C_{20}$ and $C_{22}$, $\omega$-6 | 2.3% | 2.07% |
| $C_{20:5}$, $\omega$-3 | 0.1% | 0.09% |
| $C_{22:6}$, $\omega$-3 | 0.65% | 0.59% |
| $C_{22}$, $\omega$-3 | 0.8% | 0.72% |
| $C_{20}$ and $C_{22}$, $\omega$-3 | 0.9% | 0.81% |

EXAMPLE II

Non-fat milk of sufficient volume to result in a final volume of 100 mls of formula was heated to 93° C. under constant agitation. The agitation was maintained during the heating process but foaming was avoided. The non-fat milk was heated rapidly to 93° C. to 96° C. and maintained at this temperature for 30–150 seconds.

The heated milk was then immediately cooled by addition of other formula ingredients in the following order: electrodialysed whey, the fat blend from Example I as a freshly prepared homogenate, and lactose, vitamins and minerals according to their concentrations in Table 5. Sufficient electrodialysed whey was added to make up a total of about 2.1 grams of protein, including the protein derived from the non-fat milk. The total mixture was mixed at about 57° C.–60° C. The total mixture was then rapidly heated to 71° C., homogenized and sterilized at a temperature of 113° C. for three minutes. The prepared formula was rapidly cooled to room temperature and stored as a ready-to-feed form having a solids concentration of about 12.4% w/v.

By means of the concentrations for the $C_{20}$ and $C_{22}$, $\omega$-6 and $\omega$-3 fatty acids given in Example 1, it was calculated that the 100 mls of infant formula comprised the following fatty acids:

$C_{20:4}$, $\omega$-6, about 52.9 mg.

$C_{20}$ and $C_{22}$, $\omega$-6, about 58 mg.

$C_{20:5}$, $\omega$-3, about 2.5 mg.

$C_{22:6}$, $\omega$-3, about 16.4 mg.

$C_{22}$, $\omega$-3, about 20.2 mg.

$C_{20}$ and $C_{22}$, $\omega$-3, about 22.7 mg.

Preferably, the solids concentration of the liquid processed is in a range from about 12–25% by volume. At this solids concentration, the processing conditions specified in Example II can be maintained. Preferably, the infant formula in ready-to-feed form has a solids concentration of about 12.4% w/v.

However, it will be appreciated that a more concentrated liquid may be prepared, provided that it can be diluted to the desired volume containing approximately 12.4% w/v solids.

Alternately, on cooling of the infant formula it may be spray dried and stored for future use without further stabilization or treatment of any kind. This enables a dry concentrate of the infant formula to be stored in a powder form. The dry concentrate can be diluted with water at any time to the desired volume containing approximately 12.4% w/v solids.

EXAMPLE III

To the fat blend from Example I, the following was added, expressed here per kilogram of fatty acid:

80 micrograms of prostaglandin $E_2$;

10 micrograms of 6-keto prostaglandin $F_{1\alpha}$;

10 micrograms of prostaglandin $F_{2\alpha}$.

The infant formula was prepared as described in Example II.

Based on 2.8 gm. total fatty acid, it was calculated that 100 mls. of the infant formula comprised the following prostaglandins and metabolite:

prostaglandin $E_2$, about 224 nanograms 6-keto prostaglandin $F_{1\alpha}$, about 28 nanograms prostaglandin $F_{2\alpha}$, about 28 nanograms

EXAMPLE IV

In accordance with the procedure described in Example I, an edible fat product was prepared by blending together, on a weight basis, 16% fish oil (Tilapia), 10% cocoa oil, 13% palm oil, 10% oleo oil, 26% sunflower oil, 13% coconut oil and 12% soyabean oil. This fat blend was then incorporated into an infant formula, in accordance with the procedure described in Example II. The fatty acid content of this formula is compared to the fatty acid content of a similar formula based on egg yolk lipid and coconut oil in Table 7.

TABLE 7

Fatty acid composition of formulas prepared with egg yolk lipid and fish oil:

| Fatty acids (% w/w) | with egg yolk oil | with fish oil (TILAPIA) |
|---|---|---|
| short chain fatty acids | 1.00 | 1.95 |
| $C_{12:0}$ | 5.69 | 6.46 |
| $C_{14:0}$ | 2.62 | 4.55 |
| $C_{16:0}$ | 22.70 | 19.21 |
| $C_{16:1}$ | 3.94 | 2.44 |
| $C_{18:0}$ | 11.94 | 8.08 |
| $C_{18:1}$ $\omega 9$ | 38.97 | 39.30 |
| $C_{18:2}$ $\omega 6$ | 11.49 | 12.22 |
| $C_{18:3}$ $\omega 3$ | 0.46 | 1.68 |
| $C_{20:0}$ | 0.11 | 0.20 |
| $C_{20:1}$ $\omega 9$ | 0.22 | 0.04 |
| $C_{20:2}$ $\omega 6$ | 0.10 | — |
| $C_{20:3}$ $\omega 6$ | 0.07 | 0.02 |
| $C_{20:4}$ $\omega 6$ | 0.25 | 0.13 |
| $C_{22:4}$ $\omega 6$ | 0.05 | — |
| $C_{22:5}$ $\omega 6$ | 0.03 | 0.06 |
| $\Sigma C_{20}$ and $C_{22}$ $\omega 6$ | 0.50 | 0.21 |
| $C_{20:3}$ $\omega 3$ | — | 0.13 |
| $C_{20:4}$ $\omega 3$ | — | 0.12 |
| $C_{20:5}$ $\omega 3$ | — | 2.03 |
| $C_{22:3}$ $\omega 3$ | — | — |
| $C_{22:4}$ $\omega 3$ | — | 0.32 |
| $C_{22:5}$ $\omega 3$ | 0.04 | 0.70 |
| $C_{22:6}$ $\omega 3$ | 0.07 | — |
| $\Sigma C_{20}$ and $C_{22}$ $\omega 3$ | 0.11 | 3.30 |

We claim:

1. A formula suitable for feeding infants, comprising: sugar, non-fat milk, water and an edible fat, said fat comprising at least one of
    (a) a fatty acid source containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 5–100 mg. per 100 mls. of the formula; and
    (b) a fatty acid source containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.5–60 mg. per 100 mls. of the formula, wherein the fatty acid sources are selected from the group consisting of egg yolk lipid and fish oil.

2. A formula as claimed in claim 1, which includes $C_{22}$, $\omega$-3 fatty acids in the amount of about 0.5–40 mg. per 100 mls. of the formula.

3. A formula as claimed in claim 1, comprising at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 15–70 mg. per 100 mls. of the formula.

4. A formula as claimed in claim 1, comprising at least one member of the group of $C_{20}$, $\omega$-3 fatty acids and $C_{22}$, $\omega$-3 fatty acids wherein the total of said $C_{20}$, $\omega$-3 and said $C_{22}$, $\omega$-3 fatty acids is about 2–25 mg. per 100 mls. of the formula.

5. A formula as claimed in claim 1 or 4, which includes $C_{22}$, $\omega$-3 fatty acids in the amount of about 2–25 mg. per 100 mls. of the formula.

6. A formula as claimed in claim 1, which includes a fatty acid source from each of group (a) and (b).

7. A formula as claimed in claim 1 or 6, wherein a portion of the fatty acids are derived from egg yolk lipid.

8. A formula as claimed in claim 1 or 6, wherein a portion of the fatty acids are derived from fish oil.

9. A formula as claimed in claim 1 or 6, wherein each 100 mls. of the formula contains a total of about 5–80 mg. of $C_{20:4}$, $\omega$-6 fatty acids, about 1–40 mg. of $C_{22:6}$, $\omega$-3 fatty acids, and about 0.5–15 mg. of $C_{20:5}$, $\omega$-3 fatty acids.

10. A formula as claimed in claim 1 or 6, wherein each 100 mls. of the formula contains a total of about 10–70 mg. of $C_{20:4}$, $\omega$-6 fatty acids, about 5–22 mg. of $C_{22:6}$, $\omega$-3 fatty acids, and about 2–8 mg. of $C_{20:5}$, $\omega$-3 fatty acids.

11. An edible fat product for incorporation into a formula suitable for feeding infants, said product comprising: a blend of a vegetable oil and at least one of
    (a) a fatty acid source containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 0.13%–5.6% by weight of all fatty acids in the product; and
    (b) a fatty acid source containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.013–3.33% by weight of all fatty acids in the product, wherein the fatty acid sources are selected from the group consisting of egg yolk lipid and fish oil.

12. An edible fat product as claimed in claim 11, wherein said fatty acids are derived from egg yolk lipid.

13. An edible fat product as claimed in claim 12, wherein the vegetable oil is selected from the group consisting of coconut oil, soyabean oil and mixtures thereof.

14. An edible fat product as claimed in claim 13, wherein the egg yolk lipid in the blend is about 75–95 parts by weight and the total of the coconut oil and the soyabean oil in the blend is about 5–25 parts by weight.

15. An edible fat product as claimed in claim 11, wherein said fatty acids are derived from fish oil.

16. An edible fat product as claimed in claim 15, wherein the vegetable oil is a blend of cocoa oil, palm oil, oleo oil, sunflower oil, coconut oil and soyabean oil.

17. A formula suitable for feeding infants, comprising: sugar, non-fat milk, water and an edible fat, said fat comprising a blend of a vegetable oil and at least one of
    (a) a fatty acid source containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 5–100 mg. per 100 mls. of the formula; and
    (b) a fatty acid source containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.5–60 mg. per 100 mls. of the formula, wherein said fatty acid sources are selected from the group consisting of egg yolk lipid and fish oil.

18. A formula as claimed in claim 17, wherein said fatty acids are derived from egg yolk lipid.

19. A formula as claimed in claim 18, wherein the vegetable oil is selected from the group consisting of coconut oil, soyabean oil and mixtures thereof.

20. A formula as claimed in claim 19, wherein the egg yolk lipid in the blend is about 75–95 parts by weight and the total of the coconut oil and the soyabean oil in the blend is about 5–25 parts by weight.

21. A formula as claimed in claim 17, wherein the total concentration of fatty acids in the formula is about 1.8–3.8 gm. per 100 mls. of the formula.

22. A formula as claimed in claim 20, wherein the total concentration of fatty acids in the formula is about 1.8–3.8 gm. per 100 mls. of the formula, and whereby substantially all fatty acids in the formula are derived from said blend.

23. A formula as claimed in claim 17, wherein said fatty acids are derived from fish oil.

24. A formula as claimed in claim 23, wherein the vegetable oil is a blend of cocoa oil, palm oil, oleo oil, sunflower oil, coconut oil and soyabean oil.

25. A formula as claimed in claim 22 or 24, which further includes minerals and vitamins.

26. A process for the preparation of an edible fat product for incorporation into a formula suitable for feeding infants, said process comprising: adding to a vegetable oil, at least one of
 (a) a fatty acid source containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 fatty acids is about 0.13–5.6% by weight of all fatty acids in the product; and
 (b) a fatty acid source containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.013–3.33% by weight of all fatty acids in the product, wherein said fatty acid sources are selected from the group consisting of egg yolk lipid and fish oil.

27. A process as claimed in claim 26, wherein said fatty acids are derived from egg yolk lipid.

28. A process as claimed in claim 27, wherein the vegetable oil is selected from the group consisting of coconut oil, soyabean oil and mixtures thereof.

29. A process as claimed in claim 26, wherein said fatty acids are derived from fish oil.

30. A process as claimed in claim 29, wherein the vegetable oil is a blend of cocoa oil, palm oil, oleo oil, sunflower oil, coconut oil and soyabean oil.

31. An edible fat for use in preparing a formula suitable for feeding infants, said fat comprising:
 a blend of egg yolk lipid and an oil selected from the group consisting of coconut oil, soyabean oil and mixtures thereof, wherein said egg yolk lipid and oil are present in amounts sufficient to provide an amount of $C_{20}$, $\omega$-6 and $C_{22}$, $\omega$-6 fatty acids of about 0.13–5.6% by weight of all fatty acids in the product and an amount of $C_{20}$, $\omega$-3 and $C_{22}$, $\omega$-3 fatty acids of about 0.013–3.33% by weight of all fatty acids in the product.

32. An edible fat product as claimed in claim 31, wherein the egg yolk lipid in the blend is about 75–95 parts by weight and the total of the coconut oil and the soyabean oil in the blend is about 5–25 parts by weight.

33. An edible fat for use in preparing a formula suitable for feeding infants, said fat comprising:
 a blend of fish oil, cocoa oil, palm oil, oleo oil, sunflower oil, coconut oil and soyabean oil, wherein said oils are present in amounts sufficient to provide an amount of $C_{20}$, $\omega$-6 and $C_{22}$, $\omega$-6 fatty acids of about 0.13–5.6% by weight of all fatty acids in the product, and an amount of $C_{20}$, $\omega$-3 and $C_{22}$, $\omega$-3 fatty acids of about 0.013–3.33% by weight of all fatty acids in the product.

34. A formula suitable for feeding infants, comprising: protein, carbohydrate, water, minerals, vitamins and an edible fat, said fat comprising a blend of egg yolk lipid and an oil selected from the group consisting of coconut oil, soyabean oil and mixtures thereof, wherein said egg yolk lipid and oil are present in amounts sufficient to provide an amount of $C_{20}$, $\omega$-6 and $C_{22}$, $\omega$-6 fatty acids of about 5–100 mg. per 100 mls. of the formula and an amount of $C_{20}$, $\omega$-3 and $C_{22}$, $\omega$-3 fatty acids of about 0.5–60 mg. per 100 mls. of the formula.

35. A formula as claimed in claim 34, wherein the egg yolk lipid in the blend is about 75–95 parts by weight and the total of the coconut oil and the soyabean oil in the blend is about 5–25 parts by weight.

36. A formula as claimed in claim 35, wherein the total concentration of fatty acids in the formula is about 1.8–3.8 gm. per 100 mls. of the formula.

37. A formula as claimed in claim 35, wherein the total concentration of fatty acids in the formula is about 1.8–3.8 gm. per 100 mls. of the formula, and whereby substantially all fatty acids in the formula are derived from said blend.

38. A formula suitable for feeding infants, comprising:
 protein, carbohydrate, water, minerals, vitamins and an edible fat, said fat comprising a blend of fish oil, cocoa oil, palm oil, oleo oil, sunflower oil, coconut oil and soyabean oil, wherein said oils are present in amounts sufficient to provide an amount of $C_{20}$, $\omega$-6 and $C_{22}$, $\omega$-6 fatty acids of about 5–100 mg. per 100 mls. of the formula and an amount of $C_{20}$, $\omega$-3 and $C_{22}$, $\omega$-3 fatty acids of about 0.5–60 mg. per 100 mls. of the formula.

39. A formula suitable for feeding infants, comprising: sugar, non-fat milk, water and an edible fat, said fat comprising at least one of
 (a) a fatty acid source containing at least one member of the group of $C_{20}$, $\omega$-6 fatty acids and $C_{22}$, $\omega$-6 fatty acids, wherein the total of said $C_{20}$, $\omega$-6 and said $C_{22}$, $\omega$-6 and said $C_{22}$, $\omega$-6 fatty acids is about 5–100 mg. per 100 mls. of the formula; and
 (b) a fatty acid source containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.5–60 mg. per 100 mls. of the formula, wherein the fatty acid sources are selected from the group consisting of egg yolk lipid and fish oil and wherein the total concentration of fatty acids in the formula is about 1.8–3.8 gm. per 100 mls. of the formula.

40. A formula suitable for feeding infants, comprising: sugar, non-fat milk, water and an edible fat, said fat comprising
 (a) a fatty acid source containing at least one member of the group of $C_{20}$, $\omega$-6 fatty acids and $C_{22}$, $\omega$-6 fatty acids, where the total of said $C_{20}$, $\omega$-6 and said $C_{22}$, $\omega$-6 and said $C_{22}$, $\omega$-6 fatty acids is about 5–100 mg. per 100 mls. of the formula; and
 (b) a fatty acid source containing at least one member of the group of $C_{20}$, $\omega$-3 fatty acids and $C_{22}$, $\omega$-3 fatty acids, wherein the total of said $C_{20}$, $\omega$-3 and said $C_{22}$, $\omega$-3 fatty acids is about 0.5–60 m.g per 100 mls. of the formula, wherein the fatty acid sources are selected from the group consisting of egg yolk lipid and fish oil and wherein the total concentration of fatty acids in the formula is about 1.8–3.8 gm. per 100 mls. of the formula.

41. A formula as claimed in claim 39, wherein the total concentration of fatty acids in the formula is at least 2.5 gm. per 100 mls. of the formula.

42. A formula as claimed in claim 40, wherein the total concentration of fatty acids in the formula is at least 2.5 gm. per 100 mls. of the formula.

* * * * *